MAGNETIC PATH CHOPPER FOR STATIC MAGNETIC READING HEAD

Filed Sept. 25, 1963 2 Sheets-Sheet 1

INVENTOR

Jacob Rabinow

BY Joseph A. Genovese & Max L. Libman

ATTORNEYS

MAGNETIC PATH CHOPPER FOR STATIC MAGNETIC READING HEAD

Filed Sept. 25, 1963

2 Sheets-Sheet 2

INVENTOR
Jacob Rabinow

BY Joseph A. Genovese & Max L. Libman

ATTORNEYS

United States Patent Office 3,307,163

Patented Feb. 28, 1967

3,307,163

MAGNETIC PATH CHOPPER FOR STATIC MAGNETIC READING HEAD

Jacob Rabinow, Bethesda, Md., assignor, by mesne assignments, to Control Data Corporation, Minneapolis, Minn., a corporation of Minnesota Filed Sept. 25, 1963, Ser. No. 311,369
12 Claims. (Cl. 340—174.1)

This is a continuation-in-part of application Serial No. 113,541, filed on May 29, 1961, now abandoned.

This invention relates to magnetic systems and particularly to improvements in techniques for reading magnetic code information on a magnetic medium. Although the subsequent description deals with tapes as the medium, it is understood that other magnetic media may be used in the practice of my invention.

Many machines, for instance computers, machine tools, etc., use code information of a magnetic tape as intelligence, control or both. Usually, a tape transport moves the tape past one or more stationary heads for tape readout. It is often necessary or desirable to be capable of reading the tape when it is at rest. Since magnetic readout generally relies on cutting the lines of leakage flux it is necessary to have relative movement between the tape and read head. When the tape is at rest, the only way to have the relative movement necessary to cut the lines of leakage flux, is to move the heads. In many cases, this is not a satisfactory solution.

The principal object of my invention is to provide a new system for reading out magnetic tape while the tape is at rest or moving slowly. A characteristic feature of my invention is a transfer device interposed between the magnetic tape and one or more stationary heads. The transfer device may remain at rest when the tape is moving so that the device functions as a flux transfer device. The transfer device rotates when the tape is stopped (or moving slowly), and upon such rotation the flux leakage paths exterior of the tape are effectively transferred from the tape and presented at the gap of a stationary read head. Accordingly, the stationary read head experiences the effect of tape motion while the tape and read head are each at rest.

There are a number of advantages in using a flux transfer device in combination with a stationary head. One is that numerous transfer devices may be used for multi-channel tape, and they may be packed very tightly. The devices may be wafer thin so that many channels may be provided on a tape while using conventional stationary read heads. Another advantage of my rotary transfer device interposed between a stationary read head and a tape, is that I may improve the quality of the signal from the tape before reaching the stationary read head. This is discussed in more detail below.

Magnetic systems for computers and many other machines deal with binary information, and the circuits connected with the read heads are interested only whether a given bit is a binary "1" or a binary "0." Binary numbers are usually established on the tape by the relative arrangement of north and south poles of each bit. The bits are recognized by detecting the flux direction thereof when the tape moves past the read head. Of course, the flux direction will depend on whether the head "sees" a north pole followed by a south, or a south pole followed by a north pole. More specifically if the signal transduced by the head rises and then falls, we can arbitrarily assume that the bit is a binary "1." However, if the signal first falls and then rises, the bit is identified as a binary "0." My invention greatly improves the signals before reaching the stationary read head. For example, I can amplify the signal before it reaches the stationary read head, or I can use the signal from the tape to operate a one-shot multivibrator (or the equivalent), whose output is impressed on the stationary read head. The latter alternative has the important advantage of control over the wave shape of the signal. For instance, the output of the one-shot multivibrator may be a sharp pulse of the most favorable duration for the stationary read head and the circuits with which the read head is connected. This feature is of significant importance when considering that the signal output wave form from the tape is a direct function of speed. Accordingly, the rotating transfer device would have to operate at a speed with respect to the tape which corresponds to the speed of the tape when the transfer device is at rest. Otherwise the wave forms of the output signals would be different for different rotational speeds of the transfer device. By using a one-shot multivibrator or any other means to derive a new signal of predetermined characteristics to be impressed on the stationary read head, the wave form of the new signal actually reaching the head can be made reasonably independent of the speeds of the tape and/or the rotatable transfer device.

A feature of my invention is that I may incorporate many of the circuits, e.g. the amplifier and multivibrator in the example given above, as a part of the rotating transfer device without bringing out their outputs through slip rings or commutators.

Another phase of my invention deals more closely with a tape system. Assuming that the tape is moved by a conventional tape transport, I provide means which may be either connected with the controls of the tape transport or which may be independent thereof, to rotate the transfer device when the tape transport stops the tape or moves it slowly. Additionally, I have incorporated means for assuring that the rotating transfer device will come to rest at a predetermined position in order to function properly as a flux link between the tape and the stationary head during the tape-moving mode.

Other objects and features of importance will become apparent in following the description of the illustrated forms of the invention.

Figure 1:
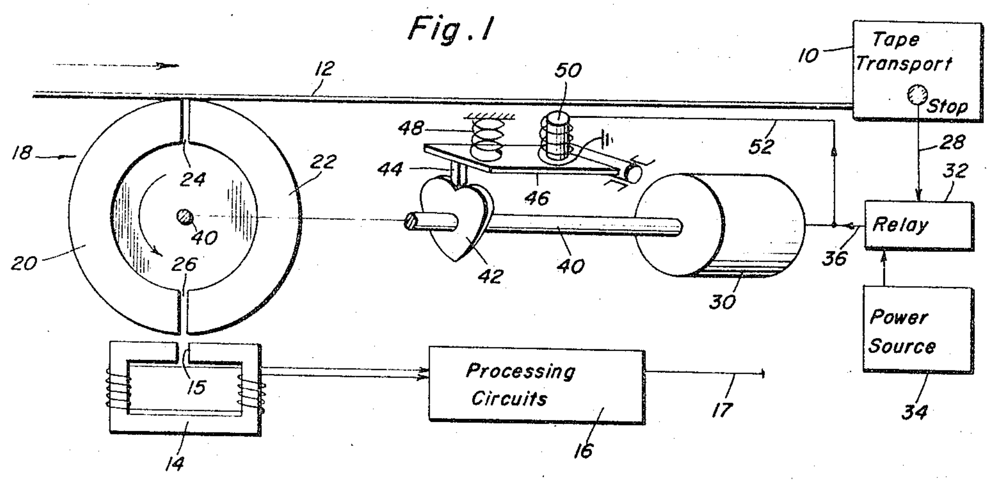
FIGURE 1 is a diagrammatic side view, partially in perspective, showing my invention used with a conventional tape transport.

In the accompanying drawings (FIGURE 1), tape transport 10 is shown as conventional, as is tape 12 which is stopped, started and moved by the tape transport at a predetermined speed or speeds. Stationary read head 14 and circuits 16 with which the stationary read head 14 is associated, are also conventional. Ordinarily, the read head 14 would be positioned very close to or touching the magnetic-particle surface of tape 12. As I show in FIGURE 1, the read head 14 is spaced from tape 12, and there is a rotary transfer device 18 interposed between the tape and the head 14. The specific details of the rotary transfer device shall be described later.

In using the transfer device 18, it remains at rest when the tape 12 is moving and establishes a flux linkage path between the tape and head 14. Thus, section 20 and 22 of the transfer device are almost semicircular leaving very narrow flux gaps 24 and 26 (shown enlarged in FIGURE 1) between the confronting ends thereof. One gap is adjacent to (or touching) tape 12 and the other is very close to the gap 15 of the stationary read head 14. When in the illustrated position, the left section 20 establishes a flux path from the tape to the left side of flux gap 15 of head 14, and the right section 22 establishes a low reluctance path from the tape to the right side of gap 15. Consequently, as the tape moves, each bit will transfer its magnetic leakage flux pattern to the stationary read head by way of transfer device 18 in the following manner.

Each bit may be considered as a small bar magnet. Assume for the purpose of explanation that the north pole of the bit is to the left and the south pole is the right as viewed in FIGURE 1. As the "bar magnet" moves across gap 24 the north-south poles orientation is preserved when the magnetic field is induced in sections 20 and 22. The same north-south pole information will be induced across gap 26. Since gap 26 is in flux-linkage relationship (or contacting) head 14 at gap 15 (and the tape is in the moving mode) the magnetic flux orientation of the bit (north-south in the example under consideration) is transferred to head 14 and then to processing circuits 16 whose output on line 17 is applied to a utilization device (not shown).

When the tape is stopped and it is desired to read the tape, e.g., to know its position and/or know the information on the tape at the point of rest, device 18 is rotated. In the illustrated example (FIGURE 1) the tape transport is stopped. Practically all currently used tape transports use electric brakes and therefore a signal on line 28 is made available when the stop switch is operated. This signal on line 28 is used to cause motor 30 to be energized. I have shown a simple circuit for obtaining this result, although it is given by way of example only. The illustrated circuit consists of a relay 32 which is set by the signal on line 28 to connect electrical potential source 34 with motor 30 by way of line 36 attached to the motor terminals and the switch section of relay 32 (the details of which are not shown). The relay may be reset after a time delay, i.e., automatically or by a manual reset circuit, or in coordination with the subsequent operation of the tape transport.

The output shaft 40 of motor 30 has sections 20 and 22 of transfer device 18 coupled thereto, for instance by a diamagnetic or insulating disc 23 attached to the shaft and by which the sections 20 and 22 are mechanically supported. Summarizing to this point, I have an arrangement where the transfer device 18 will be rotated either in coordination with the stopping of the tape 12 or by merely using a separate manual control switch (not shown) connected with the motor circuit to energize motor 30.

During the rotation of transfer device 18, gap 24 will sweep across the bit (or bits) recorded on the tape opposite the gap. Consequently, magnetic fields will be induced in sections 20 and 22, all the time preserving the north-south pole relationship of each bit. The same magnetic fields will also exist across gap 26. Since the gap 26 is very close to gap 15, it is in flux-linkage therewith so that the magnetic information, i.e., the field, is induced in head 14 and fed to the processor circuitry 16 as though the tape were in motion with head 14 located very close to or touching one surface of the tape.

It is necessary that the transfer device 18 come to rest with gaps 24 and 26 directly opposite the tape and the gap 15 of head 14 respectively when the transfer device is stopped. Therefore I have shown a "heart" shaped cam 42 attached to shaft 40 and a cam follower 44 secured to a lever 46. Each symmetrical surface of the "heart" defines a spiral path for cam follower 44. Compression spring 48 presses the lever in a direction to urge follower

44 against cam 42. The action of the spring, lever and cam follower is to mechanically rotate shaft 40 a distance necessary to bring the transfer device 18 to the position shown in FIGURE 1 when motor 30 is deenergized. During the operation of motor 30, cam follower 44 is moved away from cam 42 by a solenoid 50 whose armature is connected to lever 46, and which is energized over line 52 connected to the same source that energizes the motor 30, e.g., by connection with line 36.

Figure 2:
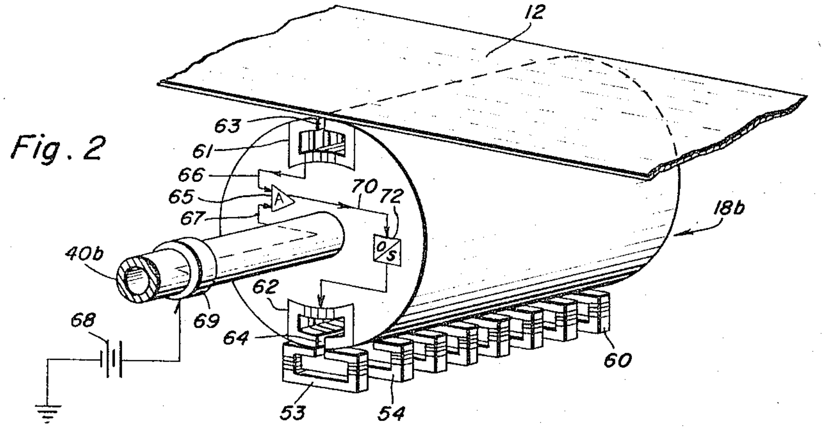
FIGURE 2 is a diagrammatic perspective view showing an embodiment of my invention being used with an eight-channel tape.
Figure 3:
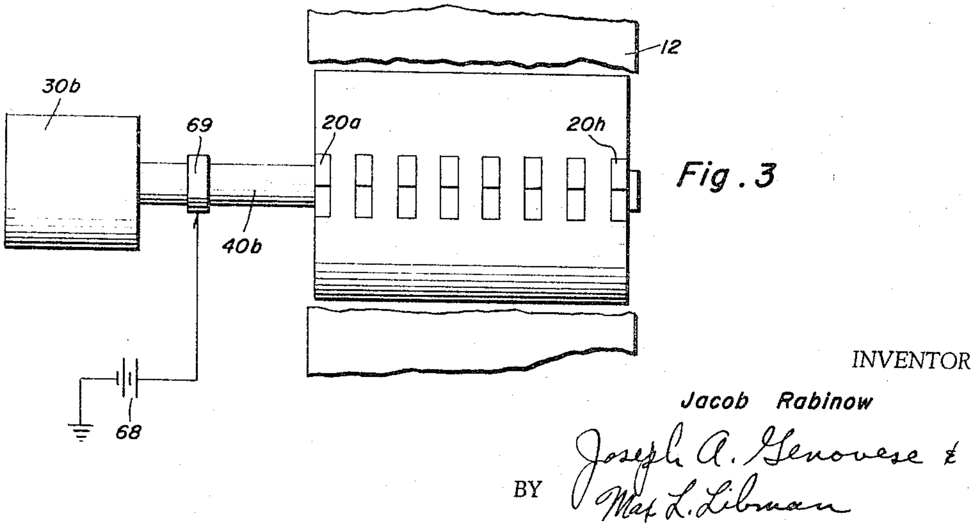
FIGURE 3 is a top view of the device in FIGURE 2, portions of the tape broken away.
Figure 6:
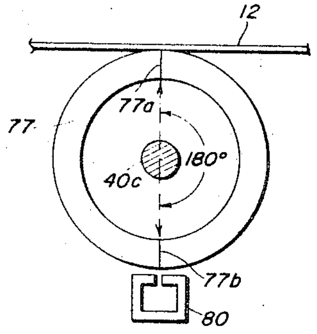
FIGURES 6–8 are diagrammatic views showing the relationship of gaps to the tape and to the stationary read heads in the embodiment of FIGURE 4.
Figure 7:
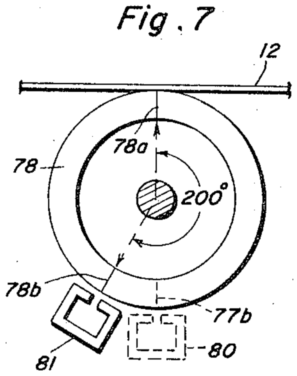
Figure 8:
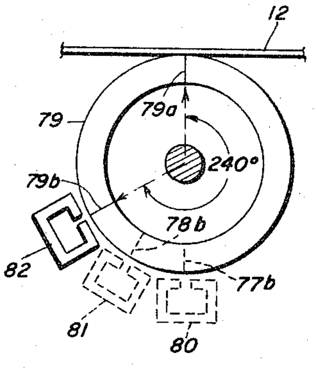

Attention is now directed to FIGURES 2 and 3. Tape 12 is shown as an eight-channel tape, although any number of channels can be used. For an eight-channel tape I have eight stationary read heads 53, 54 . . . 60 in a row transverse of the longitudinal dimension of the tape. There is one stationary read head for each channel of the tape. Rotary transfer device **18*b* is diagrammatically shown as a cylindrical body of insulating material having a shaft 40*b* attached thereto and driven by a motor 30*b*. As in FIGURE 1, rotary transfer device 18*b* is interposed between the stationary read heads 53, 54 . . . 60 and the tape 12. I have a single flux linkage assembly (FIGURE 2) for each stationary head and each assembly services a single channel of tape 12. The single assembly fully shown in FIGURE 2 consists of a head section 61 to interrogate the tape and a head section 62 to transfer or induce a flux field into head 53. Head section 61 has a gap 63 which is swept across the first channel of tape 12 at the same time that gap 64 of section 62 sweeps across the gap of stationary read head 53. I have an amplifier 65 supported by the body of transfer device 18*b*. One input line 66 of the amplifier 65 is connected with the winding of head section 61, and the other input line 67 of the amplifier is from the power source 68 by way of a slip ring assembly 69 on shaft 40*b*. The amplifier output line 70 may be directly connected with head section 62 to induce an amplified signal in the stationary head 53. The illustration shows a one-shot multivibrator 72 or the equivalent interposed in line 70 and triggered by the signal from amplifier 65. Thus, the signal applied to head section 62 may be of a predetermined wave form and duration to obtain the advantages which have been described previously. Although the amplifier 65 and multivibrator 72 may be on the exterior of the rotary transfer device 18*b*, modern transistor circuits make it possible, and preferable in some instances, to mount the amplifier and even the one-shot multivibrator or the equivalent in the rotating transfer device. Obviously, the one-shot multivibrator function may be incorporated as a part of the amplifier 65**, this being more of a matter of definition of elements than of substance.

Figure 4:
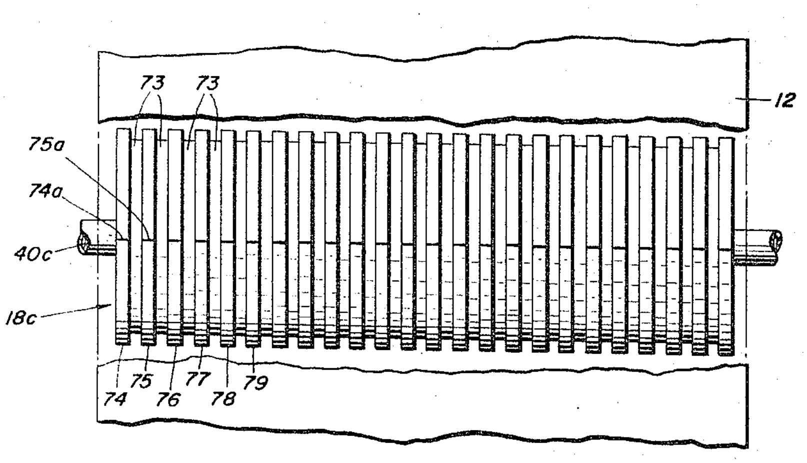
FIGURE 4 is a top view of another embodiment.
Figure 5:
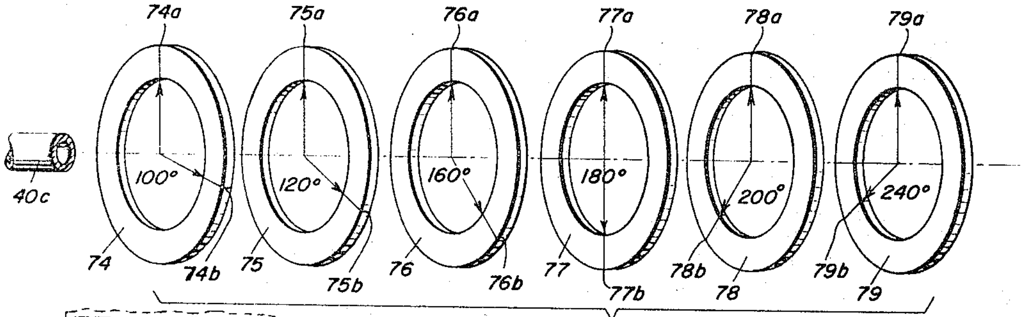
FIGURE 5 is a diagrammatic perspective view showing how elements of the transfer devices of FIGURE 4 may be arranged for readout of the tape.
Figure 9:
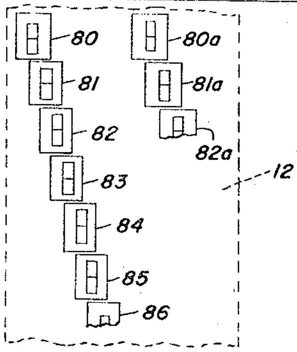
FIGURE 9 is a schematic view showing a development of a part of the surface of a transfer device like that of FIGURE 4, together with the stationary read head locations.

Attention is now invited to FIGURES 4–9. FIGURE 4 shows a rotary transfer device **18*c*, whose scale in a longitudinal dimension, i.e., along the axis of shaft 40*c*, is enlarged. The transfer device is composed of any practical number of superimposed wafers or elements, each separated from the other by means of non-magnetic ring or disc 73. Six typical elements 74, 75, 76, 77, 78 and 79 are shown in FIGURE 5. These are shown very thin so that a large number can be superposed in a small volume; but no compactness advantage would be realized if the stationary heads were arranged as shown at 53–60 in FIGURE 2. The reason is that conventional read (and/or write) heads are quite thick (measured in a direction parallel to their gaps). To overcome this difficulty, I arrange the stationary read heads in a spiral formation with the coil heads (but not the gaps) partially overlapped, around a part of the surface of the transfer device 18*c*. The spiral arrangement is illustrated (FIGURE 9) by heads 80, 81 . . . 86 as they will appear when superposed on a development of a part of the surface of device 18*c*. I show only seven heads in one spiral in FIGURE 9, while device 18*c* will service twenty-four channels, but it is understood that the additional required stationary heads can be spirally arranged in a like manner or in separate sets of spirals, as indicated by heads 80a, 81a and 82**a in FIGURE 9.

It is understood that the specific angular relationships noted on FIGURES 5–9 are given by way of example only, and can be varied in accordance with the wishes of the designer. Further, in digital recording systems, the processing circuits 16 (FIGURE 1) usually includes a register so that during the rotary mode (tape 12 at rest and devices 18b or 18c rotating), no difficulty is encountered with the repetitive signals owing to successive reading of the same bit (FIGURE 1) or character code (eight bits simultaneously read in FIGURES 2 and/or 4) or word or words (twenty-four bits simultaneously read in FIGURE 4). Alternatively, the most rudimentary logic circuitry is all that is required to pass outputs from the stationary heads only when the "tape" gaps 74a, 75a . . . 79a are aligned with the tape, and/or only once (or a predetermined number of times) while the transfer device is in the rotary mode of operation.

To accommodate (as in FIGURE 2) amplifiers 65 and wave shapers, e.g., one shot multivibrator 72, transfer device 18c can be made substantially hollow (e.g., by using rings 73 as spacers) thereby providing a cavity for the electronic components like those schematically shown in FIGURE 2.

All variations within the scope of the claims may be resorted to.

I claim:

1. In a magnetic system for a magnetic medium provided with magnetic code data arranged in bits, a stationary read head spaced from the medium, a rotary transfer device interposed and physically located between said medium and the stationary head to establish a signal linkage between the medium and said stationary read head, and said transfer device having means providing signals of predetermined characteristics for each code bit induced from the medium into said stationary read head.

2. The system of claim 1 wherein said system has a plurality of stationary heads, and said transfer device includes a plurality of transfer elements associating said heads with a plurality of channels.

3. A magnetic recording readout system for a magnetic medium having code data where the code is established by bits having a certain orientation of north and south poles, a transport to selectively move the medium and hold the medium at rest, a stationary read head for each channel of the medium, pick-up heads stationarily mounted in spaced relation to the medium, a rotary transfer device interposed between said medium and the pick-up heads and having an individual first gap for each channel, each first gap adapted to sweep across a part of the tape while the tape is at rest so that a signal is induced from the tape into the transfer device with the orientation of north and south poles preserved, said transfer device having a second gap for each first gap to induce the signal into one of said stationary read heads, and said transfer device being in a stationary position when the medium is in motion to establish a flux linkage path between the moving medium and the stationary read heads.

4. The system of claim 3 wherein there are means to amplify the signals that are induced into said transfer device before being conducted to the stationary read heads.

5. The system of claim 4 wherein there are means associated with said amplifier for providing signals having predetermined wave shapes to be induced into said stationary read heads.

6. In a magnetic recording code system having a magnetic medium provided with data whose code information is established by the arrangement of north and south poles of each bit, a transport for the medium and having means to move the medium and to stop the medium respectively, a rotary transfer device in flux linkage with the medium, a stationary read head in flux linkage with the rotary transfer device, means for rotating said transfer device when said transport holds the tape at rest so that the read head experiences a moving flux as though the tape were in motion, and means to retain said rotating transfer device at rest when the tape is moved by said tape transport.

7. The system of claim 6 wherein there are means to hold said rotary transfer device in a predetermined position at which it establishes a flux link between the tape and stationary read head when the tape is moved by said transfer device.

8. A magnetic recording readout system for a magnetic medium having code data where the code is established by bits having a certain orientation of north and south poles, a transport to selectively move the medium and hold the medium at rest, a transducer comprising a stationary read head for each channel and provided with a read head gap spaced from said medium; a rotary transfer device located between each of said read heads and said medium, said transfer device having for each channel a pair of transfer gaps so spaced that one gap is opposite the read head gap of the associated read head and the other is opposite the bit on the medium being read; and means for transferring a change in magnetic flux across one transfer gap opposite the bit being read to the transfer gap opposite the read head gap.

9. The system of claim 8 and means for holding said transfer device stationary when the medium is moving, and means for rotating said transfer device when the medium is stationary.

10. In a magnetic system including a magnetic medium provided with codes, a rotary transfer device having a set of first gaps and a set of second gaps angularly displaced with respect to said first gaps, said first and second gaps being related as pairs where a pair includes a first and a second gap, one pair of gaps adapted to service one channel of said medium, a plurality of stationary heads spaced from said medium, said transfer device located in the space between said medium and heads, said device establishing a flux path between said medium and said heads when there is relative motion between said heads and medium, and means to rotate said transfer device when there is no relative movement between said heads and medium thereby cutting the lines of leakage flux about said codes and inducing corresponding signals into said heads.

11. The subject matter of claim 10 wherein said stationary heads are staggered around said transfer device, and said second gaps are angularly spaced in a corresponding arrangement.

12. The subject matter of claim 10 and wave shaping means operable between said first and second gaps.

References Cited by the Examiner

UNITED STATES PATENTS

| | | | |
|---|---|---|---|
| 2,641,656 | 6/1953 | Dicke | 179—100.2 |

FOREIGN PATENTS

| | | |
|---|---|---|
| 832,580 | 4/1960 | Great Britain. |

BERNARD KONICK, *Primary Examiner.*

V. P. CANNEY, *Assistant Examiner.*